3,850,913
NOVEL BASIC INDOLINE DYESTUFFS
Hubertus Psaar, Leverkusen, Germany, assignor to Bayer Aktiengesellschaft, Leverkusen, Germany
No Drawing. Filed June 22, 1972, Ser. No. 265,319
Claims priority, application Germany, June 22, 1971,
P 21 30 790.4
Int. Cl. C09b 23/00
U.S. Cl. 260—240.8       12 Claims

ABSTRACT OF THE DISCLOSURE

Basic dyestuffs of the formula

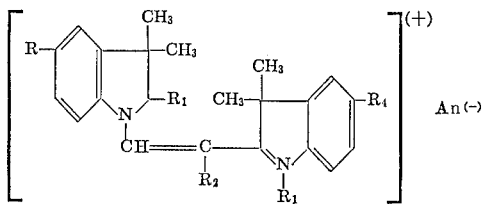

wherein R and $R_4$ mean hydrogen, an alkyl, cycloalkyl, aryl, aralkyl, alkoxy, aryloxy or aralkoxy radical, an alkyl-, aryl-, aralkyl- or acyl-amino radical, an arylsulphonamido, alkylsulphonamido, sulphonamido, carboxylic acid ester, carboxamido or acyl radical, halogen or cyano; $R_1$ and $R_3$ mean an alkyl or aralkyl radical; $R_2$ means hydrogen, an alkyl group, cyano, a carboxylic acid ester, carboxamido or alkylsulphonyl group; and $An^{(-)}$ means an anion, processes for their manufacture and their use for dyeing and printing of natural and synthetic materials.

The subject-matter of the present invention comprises dyestuffs of the general formula

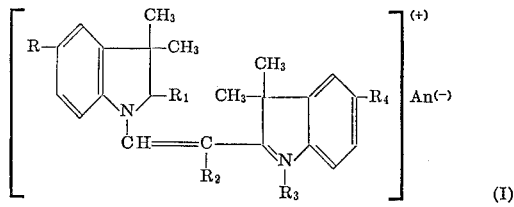

in which

R means hydrogen, an alkyl, cycloalkyl, aryl, aralkyl, alkoxy, aryloxy or aralkoxy radical, an alkyl-, aryl-, aralkyl- or acyl-amino radical, an arylsulphonamido, alkylsulphonamido, sulphonamido, carboxylic acid ester, carboxamido, or acyl radical, halogen or cyano;
$R_1$ means an alkyl, aralkyl or acyl radical;
$R_2$ means hydrogen, an alkyl group, cyano, a carboxylic acid ester, carboxamido or alkylsulphonyl group;
$R_3$ means an alkyl or aralkyl radical;
$R_4$ means hydrogen, an alkyl, cycloalkyl, aryl, aralkyl, alkoxy, aryloxy or aralkoxy group, an alkyl-, aryl-, aralkyl- or acyl-amino group, an arylsulphonamido, alkylsulphonamido, sulphonamido, carboxylic acid ester, carboxamido or acyl radical, halogen or cyano; and
$An^{(-)}$ means an anion.

The subject matter of the invention further comprises processes for the production of these dyestuffs and the use of the latter for the dyeing and printing of natural and synthetic materials, as well as the materials dyed and printed with these dyestuffs.

The term "alkyl radical" refers to a saturated or olefinic-unsaturated aliphatic radical with 1 to 6 carbon atoms, which may contain non-ionic substituents and/or carboxyl groups, for example, the methyl, ethyl, n- and iso-propyl, n-, iso- and tert.-butyl radicals and the various isomeric pentyl and hexyl radicals, as well as vinyl, allyl or propenyl radicals.

Cycloalkyl radicals means, for example, cyclopentyl and cyclohexyl radicals, which may be substituted by non-ionic radicals and/or carboxyl groups.

Aryl radicals are, for example, phenyl radicals which may be substituted by non-ionic substituents and/or carboxyl groups, and their fusion products, such as the naphthalene radical which may be substituted by non-ionic substituents and/or carboxyl groups.

Aralkyl radicals are, for example, alkyl radicals substituted by aryl or heteryl radicals.

Heteryl radicals are 5- or 6-membered unsaturated heterocyclic rings, such as the thienyl, pyridyl, pyrrolyl, indolyl-(2), indolyl-(3), benzothiazolyl-(2) or benzoxazolyl-(2) radicals.

Non-ionic substituents in the meaning of the present invention are the non-dissociating substituents customary in the chemistry of dyestuffs, such as halogen, alkyl, cycloalkyl, hydroxy, alkoxy, aralkoxy, cycloalkoxy, aryloxy, acyloxy, acyl, alkoxycarbonyl, amidocarbonyl, nitrile, amino, alkylamino, acylamino, sulphonylamino, sulphonyl, amidosulphonyl, mercapto, alkylmercapto and arylmercapto groups.

Suitable anionic radicals $An^-$ are the organic and inorganic anions customary for cationic dyestuffs.

Inorganic anions are, for example, fluoride, chloride, bromide and iodide; perchlorate, hydroxyl; radicals of S-containing acids, such as hydrogen sulphate, sulphate, disulphate and aminosulphate; radicals of nitrogen-oxo-acids, such as nitrate; radicals of oxoacids of phosphorus, such as dihydrogen phosphate, hydrogen phosphate and metaphosphate; radicals of carbonic acid, such as hydrogen carbonate and carbonate; other anions of oxoacids and complex acids, such as methosulphate, ethosulphate, hexafluorosilicate, cyanate, thiocyanate, hexacyanoferrate-(II), hexacyanoferrate-(III), tri- and tetrachlorozincate, tri- and tetrabromozincate, stannate, borate, divanadate, tetravanadate, molybdate, tungstate, chromate, bichromate and tetrafluoroborate; as well as anions of esters of boric acid, such as the glycerol ester of boric acid, and of esters of phosphoric acid, such as methyl phosphate.

Organic anions are, for example, anions of saturated or unsaturated aliphatic, cycloaliphatic, aromatic and heterocyclic carboxylic acids and sulphonic acids, such as radicals of acetic acid, chloro acetic acid, cyano acetic acid, hydroxy acetic acid, amino acetic acid, methylamino acetic acid, aminoethyl-sulphonic acid, methylaminoethylsulphonic acid, propionic acid, n-butyric acid, i-butyric acid, 2-methyl-butyric acid, 2-ethyl-butyric acid, dichloro acetic acid, trichloro acetic acid, trifluoro acetic acid, 2-chloropropionic acid, 3-chloropropionic acid, 2 - chloro-butyric acid, 2-hydroxypropionic acid, 3 - hydroxypropionic acid, O-ethylglycolic acid, thioglycolic acid, glyceric acid, malic acid, dodecyl-tetraethylene glycol etherpropionic acid, 3-(nonyloxy)-propionic acid, 3 - (isotridecyloxy) - propionic acid, 3 - (isotridecyloxy)-diethylene - glycol-ether-propionic acid, ether-propionic acid of the alcohol mixture with 6 to 10 carbon atoms, thioacetic acid, 6-benzoyl-amino-2-chloro-caproic acid, nonylphenol-tetraethylene glycol ether-propionic acid, nonylphenol-di-ethylene glycol ether-propionic acid, dodecyl-tetraethylene glycol ether-propionic acid, phenoxy acetic acid, nonyl-phenoxy acetic acid, n-valeric acid, i-valeric acid, 2,2,2-trimethyl acetic acid, n-caproic acid, 2 - ethyl-n-caproic acid, stearic acid, oleic acid, ricinoleic, palmitic acid, n-pelargonic acid, lauric acid; a mixture of aliphatic carboxylic acids with 9 to 11 carbon atoms (versatic acid 911 of Shell), a mixture of aliphatic carboxylic acids with 15 to 19 carbon atoms (versatic acid 1519 of Shell); coconut fatty acid first runnings, undecane-carboxylic acid, n-tridecane-carboxylic acid and a coconut fatty acid mixture; acrylic acid, methacrylic acid, crotonic acid, propargylic acid, oxalic acid, malonic acid, succinic acid, glutaric acid, adipic acid, pimelic acid, suberic acid, azelaic acid; isomer mixture of 2,2,4- and 2,4,4-trimethyl-adipic acid; sebacic acid, isosebacic acid (isomer mixture), tartaric acid, citric acid, glyoxylic acid, dimethylether-$\alpha,\alpha'$-dicarboxylic acid, methylene-bis-thioglycolic acid, dimethyl-sulphide-$\alpha,\alpha'$-dicarboxylic acid, 2,2' - dithio-di-$n$-propionic acid, fumaric acid, maleic acid, itaconic acid, ethylene - bis - iminoacetic acid, nitrilosulphonic acid, methane-sulphonic acid, ethane - sulphonic acid, chloromethane-sulphonic acid, 2-chloroethane-sulphonic acid and 2 - hydroxyethane - sulphonic acid; mersolate, i.e. $C_8$–$C_{15}$ paraffin-sulphonic acid, obtained by chlorosulphonation of paraffin oil.

Suitable anions of cycloaliphatic carboxylic acids are, for example, the anions of cyclohexane-carboxylic acid, cyclohexene-3 - carboxylic acid; and anions of araliphatic monocarboxylic acids are, for example, anions of phenyl-acetic acid, 4-methylphenylacetic acid and mandelic acid.

Suitable anions of aromatic carboxylic acids are, for example, the anions of benzoic acid, 2-methylbenzoic acid, 3-methylbenzoic acid, 4-methylbenzoic acid, 4-$tert$.-butyl-benzoic acid, 6-chloro-3-nitro-benzoic acid, 2,4-dinitro-3-chlorobenzoic acid, 4-chlorobenzoic acid, 2,4-dichloro-benzoic acid, 2,5-dichlorobenzoic acid, 2-nitrobenzoic acid, 3-nitrobenzoic acid, 4-nitrobenzoic acid, 2-chloro-4-nitro-benzoic acid, 6-chloro-3-nitro-benzoic acid, 2,4 - dinitro-benzoic acid, 3,4-dinitrobenzoic acid, 3,5 - dinitrobenzoic acid, 2-hydroxybenzoic acid, 3-hydroxybenzoic acid, 4-hydroxybenzoic acid, 2-mercaptobenzoic acid, 4-nitro-3-methylbenzoic acid, 4-aminobenzoic acid, 5-nitro-2-hydroxybenzoic acid, 3-nitro - 2 - hydroxybenzoic acid, 4-methoxybenzoic acid, 3-nitro-4-methoxybenzoic acid, 4-chloro-3-hydroxybenzoic acid, 3-chloro-4-hydroxybenzoic acid, 5-chloro-2-hydroxy-3-methylbenzoic acid, 4 ethyl-mercapto-2 - chlorobenzoic acid, 2 - hydroxy - 3 - methyl-benzoic acid, 6 - hydroxy - 3 - methylbenzoic acid, 2-hydroxy-4 - methylbenzoic acid, 6-hydroxy-2,4 - dimethyl-benzoic acid, 6-hydroxy-3-$tert$.-butylbenzoic acid, phthalic acid, tetrachlorophthalic acid, 4-hydroxyphthalic acid, 4-methoxyphthalic acid, isophthalic acid, 4-chloroisophthalic acid, 5-nitroisophthalic acid, terephthalic acid, nitroter-ephthalic acid and diphenylcarboxylic acid-(3,4), $o$-vanil-lic acid, 3-sulphobenzoic acid, benzene-tetracarboxylic acid-(1,2,4,5,naphthalene-tetracarboxylic acid - (1,4,5,8), biphenylcarboxylic acid-(4), abietic acid, phthalic acid mono-$n$-butyl ester, terephthalic acid monomethyl ester, 3 - hydroxy - 5,6,7,8-tetrahydronaphthalene - carboxylic acid-(2), 2-hydroxynaphthoic acid-(1) and anthraqui-none-carboxylic acid-(2).

Suitable anions of heterocyclic carboxylic acids are, for example, the anions of furoic acid, dehydromucic acid, indolyl-(3)-acetic acid.

Suitable anions of aromatic sulphonic acid are, for example, the anions of benzene-sulphonic acid, benzene-disulphonic acid-(1,3), 4-chlorobenzene-sulphonic acid, 3-nitrobenzene-sulphonic acid, 6-chloro-3-nitrobenzene-sulphonic acid, toluene-sulphonic acid-(4), toluene - sulphonic acid-(2), toluene-$\omega$-sulphonic acid, 2 - chlorotoluene-sulphonic acid-(4), 1-hydroxybenzene-sulphonic acid, $n$-dodecylbenzene - sulphonic acid, 1,2,3,4 - tetrahydro-naphthalene-sulphonic acid - (6), naphthalene-sulphonic acid-(1), naphthalene - disulphonic acid-(1,4) or -(1,5), naphthalene-trisulphonic acid-(1,3,5), naphthol - (1)-sulphonic acid-(2), 5-nitro-naphthalene-sulphonic acid-(2), 8-aminonaphthalene-sulphonic acid-(1), stilbene-sulphonic acid-(2,2') and biphenyl-sulphonic acid-(2).

A suitable anion of a heterocyclic sulphonic acid is, for example, the anion of quinoline-sulphonic acid-(5).

Further suitable anions are those of aryl-sulphinic, -phosphonic and -phosphonous acids, such as benzene-sulphinic and benzene-phosphonic acid.

Colourless or almost colourless anions are preferred. For dyeing from an aqueous solution, those anions are preferred which do not too strongly impair the water-solubility of the dyestuffs.

Among the claimed dyestuffs, special attention may be drawn to those of the formula

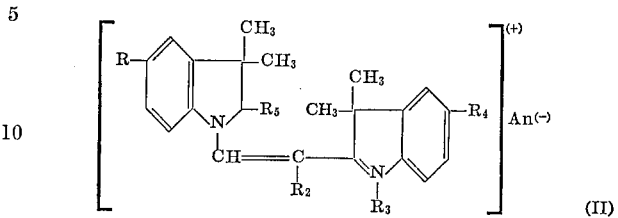

(II)

in which

R means hydrogen, an alkyl, cycloalkyl, aryl, aralkyl, alkoxy, aryloxy or aralkoxy radical, an alkyl-, aryl-, aralkyl- or acyl-amino radical, an arylsulphonamido, alkylsulphonamido, sulphonamido, carboxylic acid ester, carboxamido or acyl radical, halogen or cyano;

$R_2$ means hydrogen, an alkyl group, cyano, carboxylic acid ester, carboxamido or alkyl-sulphonyl group;

$R_3$ means an alkyl or aralkyl radical;

$R_4$ means hydrogen, an alkyl, cycloalkyl, aryl, aralkyl, alkoxy, aryloxy or aralkoxy group, an alkyl-, aryl-, aralkyl- or acyl- amino group, an arylsulphonamido, alkylsulphonamido, sulphonamido, carboxylic acid ester, carboxamido or acyl radical, halogen or cyano;

$R_5$ means a lower alkyl or an aryl-lower alkyl radical; and $An^{(-)}$ means an anion.

Valuable dyestuffs according to the present invention are the compounds of the formula

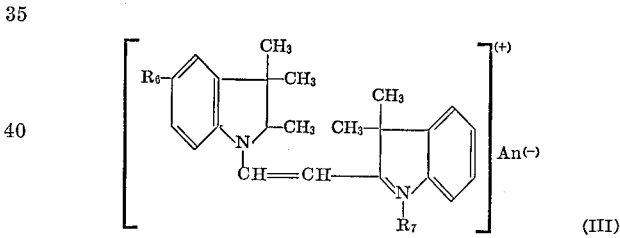

(III)

and of the formula

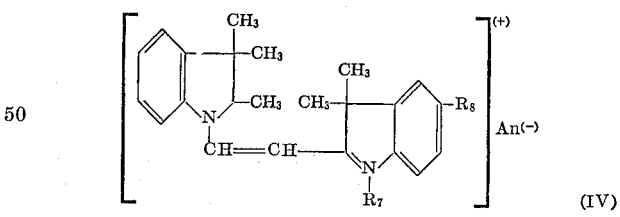

(IV)

in which $R_6$ means a lower alkoxy, benzyloxy, lower alkylamino, benzylamino or lower alkyl-carbonylamino group;

$R_7$ means a lower alkyl or benzyl radical;

$R_8$ means a lower alkoxy, benzyloxy, lower alkylamino, benzylamino or lower alkyl-carbonylamino group; and $An^{(-)}$ means an anion.

Particularly valuable are the dyestuffs of the formula

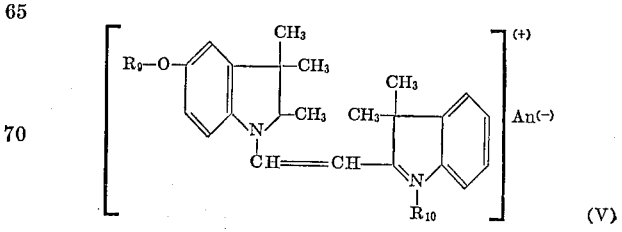

(V)

and of the formula

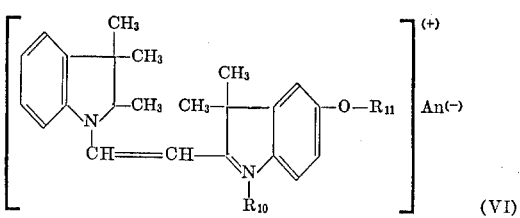

(VI)

in which

R$_9$ means a C$_1$–C$_4$ alkyl or a benzyl group;
R$_{10}$ means methyl or cyanoethyl;
R$_{11}$ means a C$_1$–C$_4$ alkyl or benzyl group; and
An$^{(-)}$ means an anion.

The dyestuffs of the general formula (I) are prepared by either reacting compounds of the general formula

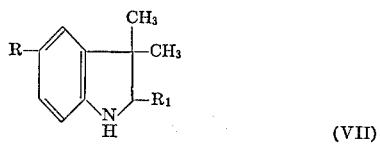

(VII)

with aldehydes of the formula

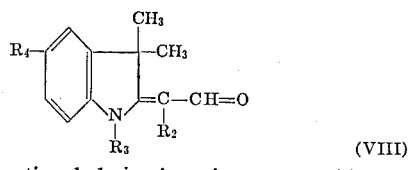

(VIII)

or with their functional derivatives, in water and/or an organic solvent, with the addition of an acidic condensation agent, or by reacting formamides of the formula

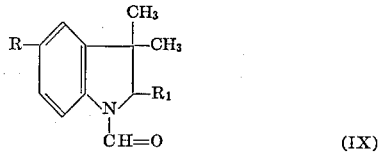

(IX)

with compounds of the formula

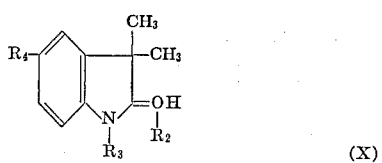

(X)

in an organic solvent, with the addition of an acidic condensation agent. The solvent or condensation agent yields the anion An$^{(-)}$ which can be exchanged after the reaction for any other anion by known methods.

In the formulae (VII) to (X) the radicals R to R$_4$ have the same meaning as in formula (I).

The dyestuffs of the general formula (II) can be prepared not only by the above methods but also by reacting compounds of the formula

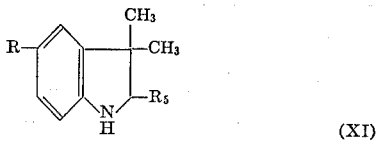

(XI)

or compounds of the formula

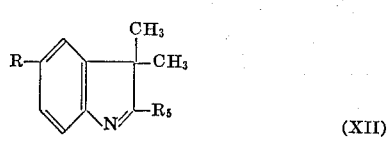

(XII)

with compounds (X) and with formic acid in an organic solvent, with the addition of an acidic condensation agent.

In the formulae (XI) and (XII) the symbols R and R$_5$ have the same meaning as in formula (II).

Compounds serving as solvents for the preparation of the dyestuffs (I) are, for example, water, alcohols, acetonitrile, dimethyl formamide, benzene, chloroform, chlorobenzene, dichlorobenzene, toluene, xylene, or acetic acid, formic acid, sulphuric acid or phosphoric acid.

Suitable acidic condensation agents are, for example, hydrogen chloride, sulphuric acid, phosphoric acid, acetic acid, phosphorus oxychloride, thionyl chloride, phosgene, ZnCl$_2$, BF$_3$, or acetic acid anhydride.

Components of the formula (VII) suitable for carrying out the process are, for example, 2,3,3-trimethylindoline,
5-methyl-2,3,3-trimethylindoline,
5-methoxy-2,3,3-trimethylindoline,
5-ethoxy-2,3,3-trimethylindoline,
5-propyloxy-2,3,3-trimethylindoline,
5-butoxy-2,3,3-trimethylindoline,
5-benzyloxy-2,3,3-trimethylindoline,
5-benzylamino-2,3,3-trimethylindoline,
5-ethylamino-2,3,3-trimethylindoline,
5-isopropylamino-2,3,3-trimethylindoline,
5-acetylamino-2,3,3-trimethylindoline,
5-methylsulphonylamino-2,3,3-trimethylindoline,
5-methoxy-2-phenylethyl-3,3-dimethylindoline,
5-methoxy-2-(4-methyloxyphenylethyl)-3,3-dimethylindoline,
5-methoxy-2-(4-methylphenylpropyl)-3,3-dimethylindoline,
5-methoxy-2-phenylbutyl-3,3-dimethylindoline,
5-methoxy-2-acetyl-3,3-dimethylindoline,
5-methoxy-2-cyanomethyl-3,3-dimethylindoline,
5-methoxy-2-ethylcarboxyethyl-3,3-dimethylindoline,
5-methoxy-2-methylcarboxyethylamido-3,3-dimethylindoline.

Suitable components of the formula (VIII) are, for example,
1,3,3-trimethyl-2-methylene-indoline-ω-aldehyde,
1,3,3-trimethyl-5-methoxy-2-methylene-indoline-ω-aldehyde,
1,3,3-trimethyl-5-ethoxy-2-methylene-indoline-ω-aldehyde,
1,3,3-trimethyl-5-propyloxy-2-methylene-indoline-ω-aldehyde,
1,3,3-trimethyl-5-butyloxy-2-methylene-indoline-ω-aldehyde,
1,3,3-trimethyl-5-benzyloxy-2-methylene-indoline-ω-aldehyde,
1,3,3,5-tetramethyl-2-methylene-indoline-ω-aldehyde,
1,3,3-trimethyl-5-benzylamino-2-methylene-indoline-ω-aldehyde,
1,3,3-trimethyl-5-dimethylamino-2-methylene-indoline-ω-aldehyde,
1,3,3-trimethyl-5-acetylamino-2-methylene-indoline-ω-aldehyde,
1,3,3-trimethyl-5-methylsulphonylamino-2-methylene-indoline-ω-aldehyde,
1,3,3-trimethyl-5-chloro-2-methylene-indoline-ω-aldehyde,
1,3,3-trimethyl-5-cyano-2-methylene-indoline-ω-aldehyde,
1,3,3-trimethyl-5-methoxycarbonyl-2-methylene-indoline-ω-aldehyde,
1,3,3-trimethyl-5-nitro-2-ethylene-indoline-ω-aldehyde,
1-ethyl-3,3-dimethyl-2-methylene-indoline-ω-aldehyde,
1-cyanoethyl-3,3-dimethyl-2-methylene-indoline-ω-aldehyde,
1-benzyl-3,3-dimethyl-2-methylene-indoline-ω-aldehyde,
1,3,3-trimethyl-2-methylene-indoline-ω-cyano-ω-aldehyde,
1,3,3-trimethyl-5-methoxy-2-methylene-indoline-ω-cyano-ω-aldehyde,
1-benzyl-3,3-dimethylindoline-ω-aldehyde.

Suitable components of the formula (IX) are, for example,

N-formyl-2,3,3-trimethylindoline,
N-formyl-2,3,3,5-tetramethylindoline,
N-formyl-5-methoxy-2,3,3-trimethylindoline,
N-formyl-5-ethoxy-2,3,3-trimethylindoline,
N-formyl-5-propyloxy-2,3,3-trimethylindoline,
N-formyl-5-butyloxy-2,3,3-trimethylindoline,
N-formyl-5-benzyloxy-2,3,3-trimethylindoline,
N-formyl-5-benzylformylamino-2,3,3-trimethylindoline,
N-formyl-5-acetylamino-2,3,3-trimethylindoline,
N-formyl-5-methoxy-2-phenylethyl-3,3-dimethylindoline,
N-formyl-5-methoxy-2-(4-methylphenylpropyl)-3,3-dimethylindoline,
N-formyl-5-methoxy-2-(4-methoxyphenylethyl)-3,3-dimethylindoline,
N-formyl-5-chloro-2,3,3-trimethylindoline,
N-formyl-5-cyano-2,3,3-trimethylindoline,
N-formyl-5-carbomethoxy-2,3,3-trimethylindoline.

Suitable components of the formula (X) are, for example,
1,3,3-trimethyl-2-methylene-indoline,
1,3,3-trimethyl-5-methoxy-2-methylene-indoline,
1,3,3-trimethyl-5-ethoxy-2-methylene-indoline,
1,3,3-trimethyl-5-propyloxy-2-methylene-indoline,
1,3,3-trimethyl-5-butyloxy-2-methylene-indoline,
1,3,3-trimethyl-5-benzyloxy-2-methylene-indoline,
1,3,3,5-tetramethyl-2-methylene-indoline,
1,3,3-trimethyl-5-dimethylamino-2-methylene-indoline,
1,3,3-trimethyl-5-acetylamino-2-methylene-indoline,
1,3,3-trimethyl-5-chloro-2-methylene-indoline,
1,3,3-trimethyl-5-cyano-2-methylene-indoline,
1-ethyl-3,3-dimethyl-2-methylene-indoline,
1-cyanoethyl-3,3-dimethyl-2-methylene-indoline,
1-benzyl-3,3-dimethyl-2-methylene-indoline,
1,3,3-trimethyl-5-methoxy-2-methylene-ω-cyanoindoline,
1,3,3-trimethyl-2-methylene-ω-cyanoindoline,
1-benzyl-3,3-dimethyl-2-methylene-ω-cyanoindoline.

Suitable components of the formula (XII) are 2,3,3-trimethyl-indolenine,
2,3,3,5-tetramethyl-indolenine,
2,3,3-trimethyl-5-methoxy-indolenine,
2,3,3-trimethyl-5-ethoxy-indolenine,
2,3,3-trimethyl-5-propyloxy-indolenine,
2,3,3-trimethyl-5-butyloxy-indolenine,
2,3,3-trimethyl-5-benzyloxy-indolenine,
2,3,3-trimethyl-5-acetylamino-indolenine,
2,3,3-trimethyl-5-chloroindolenine,
2,3,3-trimethyl-5-cyanoindolenine,
2-benzyl-3,3-dimethylindolenine,
2-phenylethyl-3,3-dimethyl-indolenine.

The dyestuffs according to the invention are suitable for the dyeing, printing and dyeing in the mass of natural, semi-synthetic and synthetic materials, mainly for materials consisting of polyacrylonitrile or of copolymers of acrylonitrile with other vinyl compounds, such as vinyl chloride, vinylidene chloride, vinyl fluoride, vinyl acetate, vinyl alcohol, acrylic and methacrylic acid esters and amides, as, dicyanoethylene; or of acid-modified aromatic polyester. Acid-modified aromatic polyesters are, for example, polycondensation products of sulphoterephthalic acid and ethylene glycol, i.e. polyethylene glycol terephthalates containing sulphonic acid groups (type Dacron 64 of E. I. du Pont de Nemours and Company), such as are described in Belgian patent specification No. 549,179 and U.S. patent specification No. 2,893,816. The dyestuffs are also suitable for dyeing acid-modified polyamides.

The dyeings and prints on these materials have excellent fastness properties, especially fastness to light. The dyestuffs are characterised by their unusual colour intensity and have a very good resist effect in respect of wool, cotton and non-acid-modified polyesters and polyamides.

The parts given in the examples are parts by weight.

EXAMPLE 1

21 parts 5-methoxy-2,3,3-trimethyl-indolenine were hydrogenated with 0.5 parts of Raney nickel as catalyst and 2.5 parts methanol at 170° C. and 150 atm. excess pressure in an autoclave. The catalyst was filtered off. 25 parts glacial acetic acid and 22.5 parts 1,3,3-trimethyl-2-methylene-indolenine - ω-aldehyde were then added, and the mixture was stirred at room temperature for 4 hours. The solution was stirred into 500 parts of a 3% sodium chloride solution and 10 parts of concentrated hydrochloric acid. After one hour, the dyestuff was filtered off with suction and dried at 70° C. in a vacuum. It has the formula

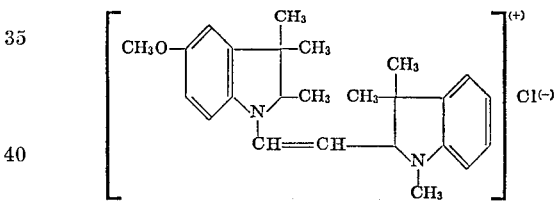

and is suitable for the dyeing, printing and dyeing in the mass of polyacrylonitrile, acid-modified polyesters or polyamides in clear and very fast yellow shades.

When the 5-methoxy-2,3,3-trimethyl-indolenine is replaced in the present example with 2,3,3-trimethyl-indolenine and the 1,3,3-trimethyl-2-methylene-ω-aldehyde is replaced with 5 - methoxy - 1,3,3-trimethyl-2-methylene-ω-aldehyde, then the dyestuff described in example is obtained.

The following table describes dyestuffs which were prepared according to Example 1. The table contains the components of the dyestuffs and the shades of the latter on polyacrylonitrile fibres.

| Indolenine base | Aldehyde | Shade |
| --- | --- | --- |
| 5-ethoxy-2,3,3-trimethyl-indolenine. | 1,3,3-trimethyl-2-methylene-indoline ω-aldehyde. | Greenish yellow. |
| 5-propyloxy-2,3,3-trimethyl-indolenine. | do | Do. |
| 5-butyloxy-2,3,3-trimethyl-indolenine. | do | Do. |
| 5-benzyloxy-2,3,3-trimethyl-indolenine. | do | Do. |
| 5-methoxy-2,3,3-trimethyl-indolenine. | 5-chloro-1,3,3-trimethyl-2-methylene-indoline-ω-aldehyde. | Do. |
| Do | 5-cyano-1,3,3-trimethyl-2-methylene-indoline-ω-aldehyde. | Do. |
| Do | 5-methyl-1,3,3-trimethyl-2-methylene indoline-ω-aldehyde. | Do. |
| Do | 5-carbomethoxy-1,3,3-trimethyl-2-methylene-indoline-ω-aldehyde. | Do. |
| 5-chloro-2,3,3-trimethyl-indolenine. | 5-methoxy-1,3,3-trimethyl-2-methylene-indoline-ω-aldehyde. | Do. |
| 5-methyl-2,3,3-trimethyl-indolenine. | do | Do. |
| Do | 5-methoxy-1,3,3-trimethyl-2-methylene-indoline-ω-cyano-ω-aldehyde. | Do. |

EXAMPLE 2

38.4 parts 2,3,3 - trimethyl-indolenine were stirred in 300 parts chlorobenzene and 50 parts formic acid at 120° C. for 2 hours. 220 parts chlorobenzene were distilled off, and 49 parts 5 - methoxy-1,3,3-trimethyl-2-methylene-indoline and 40 parts phosphorus oxychloride were added to the residue at 60° C. The mixture was stirred at 60° C. for 2 hours and then added to a solution of 100 parts sodium acetate in 1000 parts of water. The chlorobenzene was separated, the dyestuff was precipitated from the aqueous phase with sodium chloride and dried in a vacuum at 70° C. It has the formula

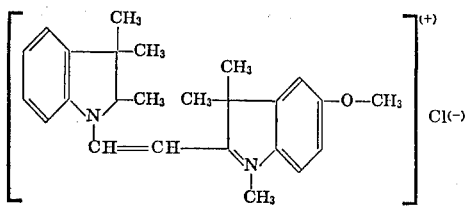

and dyes fibres of polyacrylonitrile as well as acid-modified polyester and polyamide fibres in brilliant yellow shades.

When the 2,3,3-trimethyl-indolenine is replaced with 5-methoxy - 2,3,3-trimethyl-indolenine and the 5-methoxy-1,3,3 - trimethyl-2-methyelne-indolenine is replaced with 1,3,3 - trimethyl-2-methylene-indoline, then the dyestuff described in Example 1 is obtained.

The following table describes dyestuffs which were prepared according to Example 2. The table contains the components of the dyestuffs and the shades of the latter on polyacrylonitrile fibres.

The 5-methoxy-2-phenylethyl-3,3-dimethyl-indoline was prepared according to Example 1 by catalytic hydrogenation.

When the 5 - methoxy-2-phenylethyl-3,3-dimethylindoline is replaced with 5-methoxy-2,3,3-trimethylindoline, then the dyestuff described in Example 1 is obtained.

EXAMPLE 4

19 parts N-formyl-2,3,3-trimethyl-indoline and 23 parts 5 - acetylamino-1,3,3-trimethyl-2-methylene-indoline were stirred in 100 parts xylene with 15.6 parts phosphorus oxychloride at 60° C. for 2 hours. 30 parts methanol were then added. The dyestuff was filtered off with suction and recrystallised from water. It has the formula

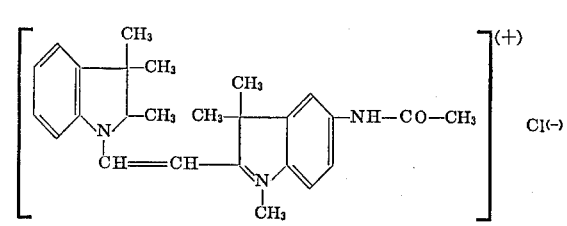

and dyes polyacrylonitrile fibres in fast yellow shades.

The N-formyl-2,3,3-trimethyl-indoline was prepared from 2,3,3-trimethyl-indolenine by reaction with formic acid in chlorobenzene at 120° C. and isolated by distillation.

When the 5-acetylamino-1,3,3-trimethyl-2-methylene-indoline is replaced with 5-methoxy-1,3,3-trimethyl-2-methylene-indoline, then the dyestuff described in Example 2 is obtained.

| Indolenine base | Aldehyde | Shade |
|---|---|---|
| 5-cyano-2,3,3-trimethyl-indolenine. | 5-methoxy-1,3,3-trimethyl-2-methylene-indoline. | Greenish yellow. |
| 2,3,3-trimethyl-indolenine | 5-ethoxy-1,3,3-trimethyl-2-methylene-indoline. | Do. |
| Do. | 5-propyloxy-1,3,3-trimethyl-2-methylene-indoline | Do. |
| Do. | 5-butyloxy-1,3,3-trimethyl-2-methylene-indoline. | Do. |
| Do. | 5-benzyloxy-1,3,3-trimethyl-2-methylene-indoline. | Do. |
| 5-methoxy-2,3,3-trimethyl-indolenine. | do | Do. |
| 5-benzyloxy-2,3,3-trimethyl-indolenine. | 5-methoxy-1,3,3-trimethyl-2-methylene-indoline. | Do. |
| 5-ethoxy-2,3,3-trimethyl-indolenine. | do | Do. |
| 5-methoxy-2,3,3-trimethyl-indolenine. | 1-cyanoethyl-3,3,dimethyl-2-methylene-indoline. | Do. |
| Do. | 1-benzyl-3,3-dimethyl-2-methylene-indoline. | Do. |

EXAMPLE 3

26.9 parts 5-methoxy-2-phenylethyl-3,3-dimethyl-indoline and 20.2 parts 1,3,3-trimethyl-2-methylene-indoline-ω-aldehyde were stirred in 150 parts chloroform with 15.6 parts phosphorus oxychloride at 50–60° C. for one hour. The chloroform was distilled off, and the dyestuff was recrystallised from water with the addition of active charcoal. It has the formula

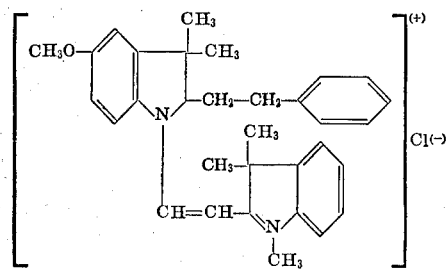

and dyes polyacrylonitrile fibres in clear yellow shades.

EXAMPLE 5

21.8 parts 5-acetylamino-1,3,3-trimethyl-indoline and 20.2 parts 1,3,3-trimethyl-2-methylene-indoline-ω-aldehyde were stirred in 40 parts methanol and 10 parts of concentrated hydrochloric acid at room temperature for 3 hours. The solution was stirred into 600 parts of a 5% sodium chloride solution. After 3 hours, the dyestuff was filtered off with suction and dried at 40° C. in a vacuum. It has the formula

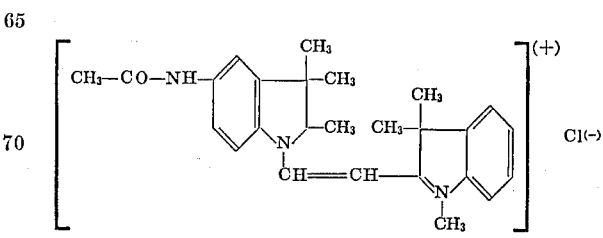

and dyes polyacrylonitrile fibers in fast yellow shades.

The 5-acetylamino-2,3,3-trimethyl-indoline was prepared according to Example 1 by catalytic hydrogenation.

The following dyestuffs were prepared according to Example 5:

| Indoline base | Aldehyde | Shade |
|---|---|---|
| 5-methoxy-2-(4-methylphenylethyl)-3,3-dimethyl-indoline. | 1,3,3-trimethyl-2-methylene-indoline-ω-aldehyde | Greenish yellow. |
| 5-methoxy-2-(methylcarboxyethyl-amide)-3,3-dimethyl-indoline. | ....do.... | Do. |
| 5-isopropylamino-2,3,3-trimethyl-indoline. | ....do.... | Do. |
| 5-benzylamino-2,3,3-trimethyl-indoline. | ....do.... | Do. |
| 5-ethylamino-2,3,3-trimethyl-indoline | ....do.... | Do. |
| 5-cyclohexylamino-2,3,3-trimethyl-indoline. | ....do.... | Do. |
| 5-ethyluriedo-2,3,3-trimethyl-indoline | ....do.... | Do. |

EXAMPLE 6

21.9 parts N-formyl-5-methoxy-2,3,3-trimethyl-indoline were dissolved in 150 parts benzene. 12 parts phosgene were introduced at room temperature, and the mixture was stirred at 30° C. for one hour. 21 parts 5-methoxy-1,3,3-trimethyl-2-methylene-indoline were then added, and the mixture was stirred at 60° C. for 2 hours. 100 parts benzene were distilled off, the dyestuff was filtered off with suction and recrystallised from water. It has the formula

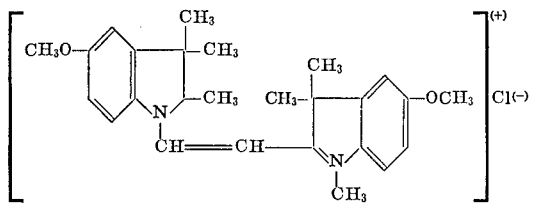

and dyes polyacrylonitrile fibres in fast yellow shades.

EXAMPLE 7

Polyacrylonitrile fibres are introduced at 40° C. in a liquor ratio of 1:40 into an aqueous bath containing, per litre, 0.75 g. of 30% acetic acid, 0.38 g. sodium acetate and 0.15 g. of the dyestuff described in Example 2. The bath is heated to boiling temperature within 20–30 minutes and kept at the same temperature for 30–60 minutes. After rinsing and drying, a greenish yellow dyeing of very good fastness properties is obtained.

EXAMPLE 8

Acid-modified polyglycol terephthalate fibres are introduced at 20° C. in a liquor ratio of 1:40 into an aqueous bath which contains, per litre, 3–10 g. sodium sulphate, 0.1–1 g. oleyl polyglycol ether (50 mol ethylene oxide), 0–15 g. dimethylbenzyl dodecylammonium chloride and 0.15 g. of the dyestuff described in Example 1 and which was adjusted to pH 4–5 with the aid of acetic acid. The bath is heated to 100° C. within 30 minutes and kept at the same temperature for 60 minutes. The fibres are subsequently rinsed and dried. A greenish yellow dyeing of very good fastness properties is obtained.

EXAMPLE 9

In a dyeing beaker of 500 ml. capacity which is placed on a heated water bath, 0.055 g. of the dyestuff described in Example 1 are pasted with 20 times this amount of hot water with the addition of some acetic acid, and dissolved with hot water. 0.5 g. of the reaction product of 50 mol ethylene oxide with 1 mol oleyl alcohol are also added to the dyeing liquor which is made up with cold water to a volume of 500 ml. The pH value of the dyeing liquor is adjusted to 4.5–5 with the aid of acetic acid or sodium acetate.

10 g. of piece goods of acid-modified polyamide are continuously moved about in this dyebath while the temperature is raised to 100° C. within 15 minutes. The material is dyed at boiling temperature for 15–20 minutes, rinsed with cold water, and subsequently dried. A very fast greenish-yellow dyeing is obtained.

EXAMPLE 10

A fabric of polyacrylonitrile is printed with a printing paste which was prepared in the following way:

330 parts of hot water are poured over 30 parts of the dyestuff described in Example 2, 50 parts thiodiethylene glycol, 30 parts cyclohexanol and 30 parts of 30% acetic acid, and the resultant solution is added to 500 parts of dextrin as thickening agent. Finally, 30 parts of a zinc nitrate solution are added. The resultant print is dried, steamed for 30 minutes and subsequently rinsed. A greenished yellow print of very good fastness properties is obtained.

What is claimed is:
1. Basic dyestuff of the formula

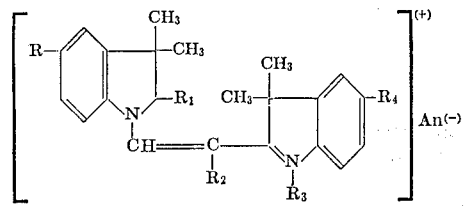

wherein

R and $R_4$, independently of each other, are hydrogen, alkyl of 1–6 carbon atoms, cyclopentyl, cyclohexyl, phenyl, naphthyl, phenylalkyl of 1–6 carbon atoms in the alkyl portion, alkoxy of 1–6 carbon atoms, naphthyloxy, phenyloxy, benzyloxy, alkylamino of 1–6 carbon atoms, cyclohexylamino, phenylamino, naphthylamino, benzylamino, acetylamino, ethylureido, sulfonamido, alkylsulfonamido of 1–6 carbon atoms, phenylsulfonamido, naphthylsulfonamido, carbomethoxy, carboxamido, halo, cyano, or the aforesaid radicals wherein the alkyl portion or the aromatic ring is further substituted by halo, hydroxy, cyclohexyl, cyclopentyl, alkoxy of 1–6 carbon atoms, benzyloxy, phenyloxy, alkoxycarbonyl of 1–6 carbon atoms in the alkyl portion, cyano, aminocarbonyl, amino, alkylamino of 1–6 carbon atoms, dialkylamino of 1–6 carbon atoms in each alkyl portion, acetylamino, sulfonylamino, mercapto, alkylmercapto of 1–6 carbon atoms, or phenylmercapto; and additionally wherein the aromatic ring is substituted by alkyl of 1–6 carbon atoms;

$R_1$ is alkyl of 1–6 carbon atoms, phenylalkyl of 1–6 carbon atoms in the alkyl portion, or the aforesaid radicals wherein the alkyl portion or the aromatic ring is further substituted by halo, hydroxy, cyclohexyl, cyclopentyl, alkoxy of 1–6 carbon atoms, benzyloxy, phenyloxy, alkoxycarbonyl of 1–6 carbon atoms in the alkyl portion, cyano, aminocarbonyl, amino, alkylamino of 1–6 carbon atoms, dialkylamino of 1–6 carbon atoms in each alkyl portion, acetylamino, sulfonylamino, mercapto, alkylmercapto of 1–6 carbon atoms, or phenylmercapto; and additionally wherein the aromatic ring is substituted by alkyl of 1–6 carbon atoms;

$R_2$ is hydrogen, alkyl of 1–6 carbon atoms, cyano, carboxamido, alkylsulfonyl of 1–6 carbon atoms, or said alkyl or alkylsulfonyl wherein the alkyl portion is further substituted by halo, hydroxy, cyclohexyl, cyclopentyl, alkoxy of 1–6 carbon atoms, benzyloxy, phenyloxy, alkoxycarbonyl of 1–6 carbon atoms in the alkyl portion, cyano, aminocarbonyl, amino, alkylamino of 1–6 carbon atoms, dialkylamino of 1–6 carbon atoms, in each alkyl portion, acetylamino, sulfonylamino, mercapto, alkylmercapto of 1–6 carbon atoms, or phenylmercapto;

$R_3$ is alkyl of 1–6 carbon atoms, phenylalkyl of 1–6 carbon atoms in the alkyl portion, or the aforesaid radicals wherein the alkyl portion or the aromatic ring is further substituted by halo, hydroxy, cyclohexyl, cyclopentyl, alkoxy of 1–6 carbon atoms, benzyloxy, phenyloxy, alkoxycarbonyl of 1–6 carbon atoms in the alkyl portion, cyano, aminocarbonyl, amino, alkylamino of 1–6 carbon atoms, dialkylamino of 1–6 carbon atoms in each alkyl portion, acetylamino, sulfonylamino, mercapto, alkylmercapto of 1–6 carbon atoms, or phenylmercapto; and additionally wherein the aromatic ring is substituted by alkyl of 1–6 carbon atoms; and $An^{(-)}$ is an anion.

2. The dyestuff of Claim 1 wherein

R is hydrogen, methyl, methoxy, ethoxy, propoxy, butoxy, benzyloxy, chloro, cyano, acetylamino, isopropylamino, benzylamino, ethylamino, cyclohexylamino, or ethylureido;

$R_1$ is methyl, phenylethyl, or 4-methylphenylethyl;

$R_2$ is hydrogen or cyano;

$R_3$ is hydrogen, methyl, cyanoethyl, or benzyl;

$R_4$ is hydrogen, methyl, methoxy, ethoxy, propoxy, butoxy, benzyloxy, chloro, cyano, carbomethoxy, or acetylamino; and $An^{(-)}$ is an anion.

3. Basic dyestuffs of the general formula

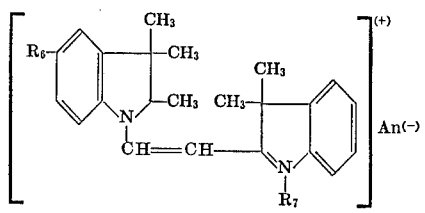

and of the general formula

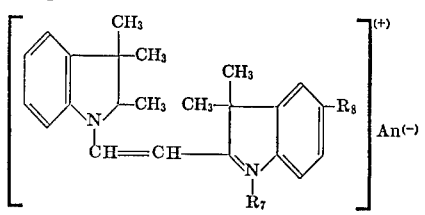

in which $R_6$ and $R_8$ mean alkoxy of 1–6 carbon atoms, benzyloxy, alkylamino of 1–6 carbon atoms, benzylamino, or acetylamino;

$R_7$ means alkyl of 1–6 carbon atoms or benzyl; and $An^{(-)}$ means an anion.

4. Basic dyestuffs of the general formula

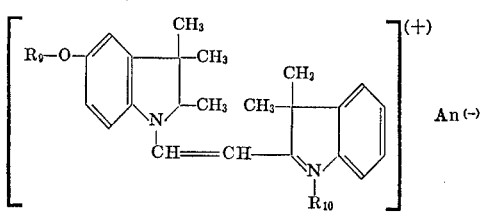

and of the general formula

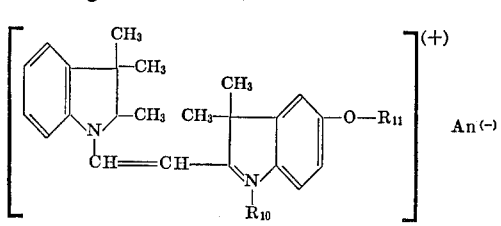

in which $R_9$ means a $C_1$–$C_4$ alkyl or a benzyl group;

$R_{10}$ means methyl or cyanoethyl;

$R_{11}$ means a $C_1$–$C_4$ alkyl or a benzyl group;

$An^{(-)}$ means an anion.

5. A basic dyestuff of the formula

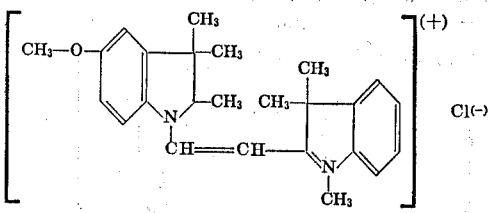

6. A basic dyestuff of the formula

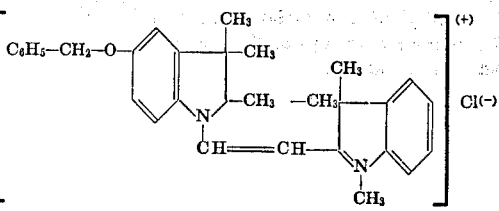

7. A basic dyestuff of the formula

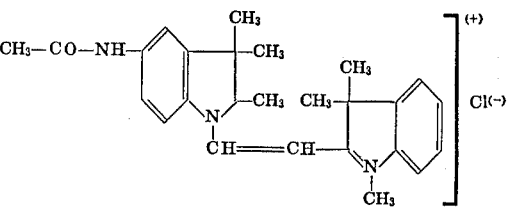

8. A basic dyestuff of the formula

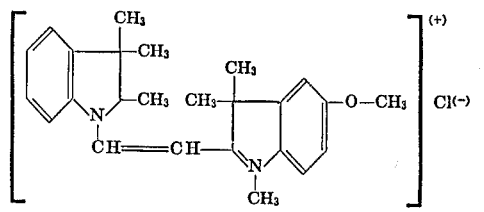

9. A basic dyestuff of the formula

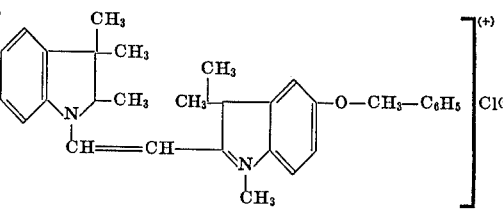

10. A basic dyestuff of the formula

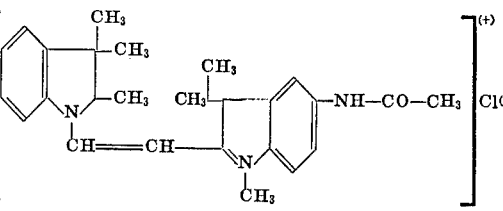

11. Dyestuff of Claim 3 of the formula

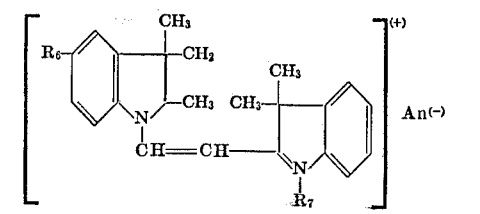

wherein $R_6$ is alkoxy of 1–6 carbon atoms, benzyloxy, alkylamino of 1–6 carbon atoms, benzylamino, or acetylamino;

$R_7$ is alkyl of 1-6 carbon atoms or benzyl; and
$An^{(-)}$ is an anion.
12. Dyestuff of Claim 4 of the formula
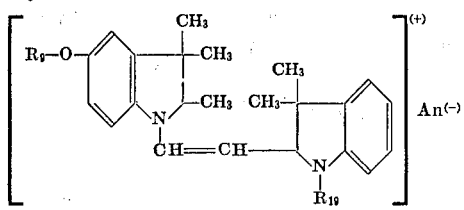
wherein
$R_9$ is alkyl of 1-4 carbon atoms or benzyl;
$R_{10}$ is methyl or cyanoethyl; and
$An^{(-)}$ is an anion.
References Cited
UNITED STATES PATENTS
| 2,077,063 | 4/1937 | Wolff | 260—240.8 |
| 2,155,447 | 4/1939 | Roh et al. | 260—240.8 |
FOREIGN PATENTS
| 666,081 | 10/1938 | Germany | 260—240.8 |
JOHN D. RANDOLPH, Primary Examiner
U.S. Cl. X.R.
8—62, 177 AB, 178 R, 179; 260—240.1, 319.1, 326.11 R, 326.16